United States Patent [19]
Åström et al.

[11] Patent Number: 6,134,441
[45] Date of Patent: Oct. 17, 2000

[54] TELEMETRY APPLICATION NUMBERING FOR SMS AND USSD

[75] Inventors: Bo Åström, Hågersten; Jeremy Hamill-Keays, Sollentuna, both of Sweden

[73] Assignee: Telefonaktiebolget LM Ericsson, Stockholm, Sweden

[21] Appl. No.: 08/886,041

[22] Filed: Jun. 30, 1997

[51] Int. Cl.[7] .............................. H04Q 7/20; H04B 1/38
[52] U.S. Cl. ......................... 455/445; 455/466; 455/552
[58] Field of Search .................................. 455/31.2, 466, 455/421, 445, 461, 418, 551, 552, 432

[56] References Cited

U.S. PATENT DOCUMENTS

| | | | |
|---|---|---|---|
| 5,155,689 | 10/1992 | Wortham | 455/456 |
| 5,369,681 | 11/1994 | Boudreau et al. | 455/456 |
| 5,454,032 | 9/1995 | Pinard et al. | 379/167 |
| 5,467,381 | 11/1995 | Peltonen et al. | 455/432 |
| 5,537,457 | 7/1996 | Lantto et al. | |
| 5,539,810 | 7/1996 | Kennedy, III et al. | 379/88.25 |
| 5,579,372 | 11/1996 | Åstrom | |
| 5,603,084 | 2/1997 | Henry, Jr. et al. | 455/419 |
| 5,649,301 | 7/1997 | Yabusaki et al. | 455/433 |
| 5,694,393 | 12/1997 | Kaye | 370/408 |
| 5,742,668 | 4/1998 | Pepe et al. | 455/415 |
| 5,752,188 | 5/1998 | Astrom et al. | 455/433 |

(List continued on next page.)

FOREIGN PATENT DOCUMENTS

| | | |
|---|---|---|
| 651 586 A2 | 5/1995 | European Pat. Off. . |
| WO 92/14329 | 8/1992 | WIPO . |
| WO 95/09514 | 4/1995 | WIPO . |

OTHER PUBLICATIONS

Martini et al., "Distributed Architecture for Applications Based on the GSM Short Message Services", International Workshop on Services in Distributed and Networked Environments, Jun. 5, 1995, pp. 140–145.

Aguilera, "Fixed Cellular Access", 1225 Electrical Communication (1$^{st}$Quarter), Jan. 1, 1995, Paris, France, pp. 43–46.

Nakajima et al., "Automatic Pursuit Routing For Mobile Communications Network", 433a Electronics and Communications in Japan, vol. 73, No. 3, Part 1, Mar. 1990, New York, NY, pp. 81–90.

Mandel et al, "DAl in Analog–Zellularer Technik", Nachrichtentechnik Elektronik, vol. 42, No. 4, Jul. 1992–Aug. 1992, Berlin DE, pp. 130–135. No written English–language translation of this German–language document is readily available to the undersigned. The document is being submitted because of its citation in Search Report that issued in connection with the subject U.S. patent application.

Leipold, "DAl –Funktechnik Im Teilnehmeranschlussereich"Ntz Nachrichtentechnische Zeitschrift, vol. 45, No. 4, 1 Apr. 1992, Berlin, DE, pp. 286–287. No written English–language translation of this German–language document is readily available to the undersigned. The document is being submitted because of its citation in a Search Report that issued in connection with the subject U.S. patent application.

*Primary Examiner*—Reinhard J. Eisenzopf
*Assistant Examiner*—Charles N. Appiah
*Attorney, Agent, or Firm*—Burns, Doane, Swecker & Mathis, L.L.P.

[57] ABSTRACT

In a mobile telecommunications switching network, mobile stations may be used in static applications such as a telemetry application. The telecommunications switching network can reduce and/or eliminate subscriber numbers allocated to mobile stations that are used in static applications by taking advantage of the fact that the location of such mobile stations is always known and does not change. Accordingly, the mobile stations can be identified and located within the switching network by a unique combination of paging area identification number (e.g., a mobile switching center identification code) and international mobile subscriber identity, rather than by a unique mobile subscriber number (MSN) or mobile station ISDN (MSISDN). Consequently, there is no need to obtain the location information from the network home location register as a function of the MSN or the MSISDN.

31 Claims, 5 Drawing Sheets

U.S. PATENT DOCUMENTS

| | | | |
|---|---|---|---|
| 5,765,105 | 6/1998 | Kuriki | 455/410 |
| 5,777,560 | 7/1998 | Sakai et al. | 340/825.44 |
| 5,797,103 | 8/1998 | Duda | 455/567 |
| 5,799,084 | 8/1998 | Gallagher et al. | 380/23 |
| 5,815,810 | 9/1998 | Gallant et al. | 455/433 |
| 5,828,959 | 10/1998 | Soderbacka | 455/445 |
| 5,835,856 | 11/1998 | Patel | 455/406 |
| 5,839,072 | 11/1998 | Chien | 455/445 |
| 5,867,788 | 2/1999 | Joensuu | 455/445 |
| 5,884,179 | 3/1999 | Patel | 455/445 |
| 5,884,221 | 3/1999 | Wortham | 701/300 |
| 5,890,064 | 3/1999 | Widergren et al. | 455/445 |
| 5,946,615 | 8/1999 | Holmes et al. | 455/412 |

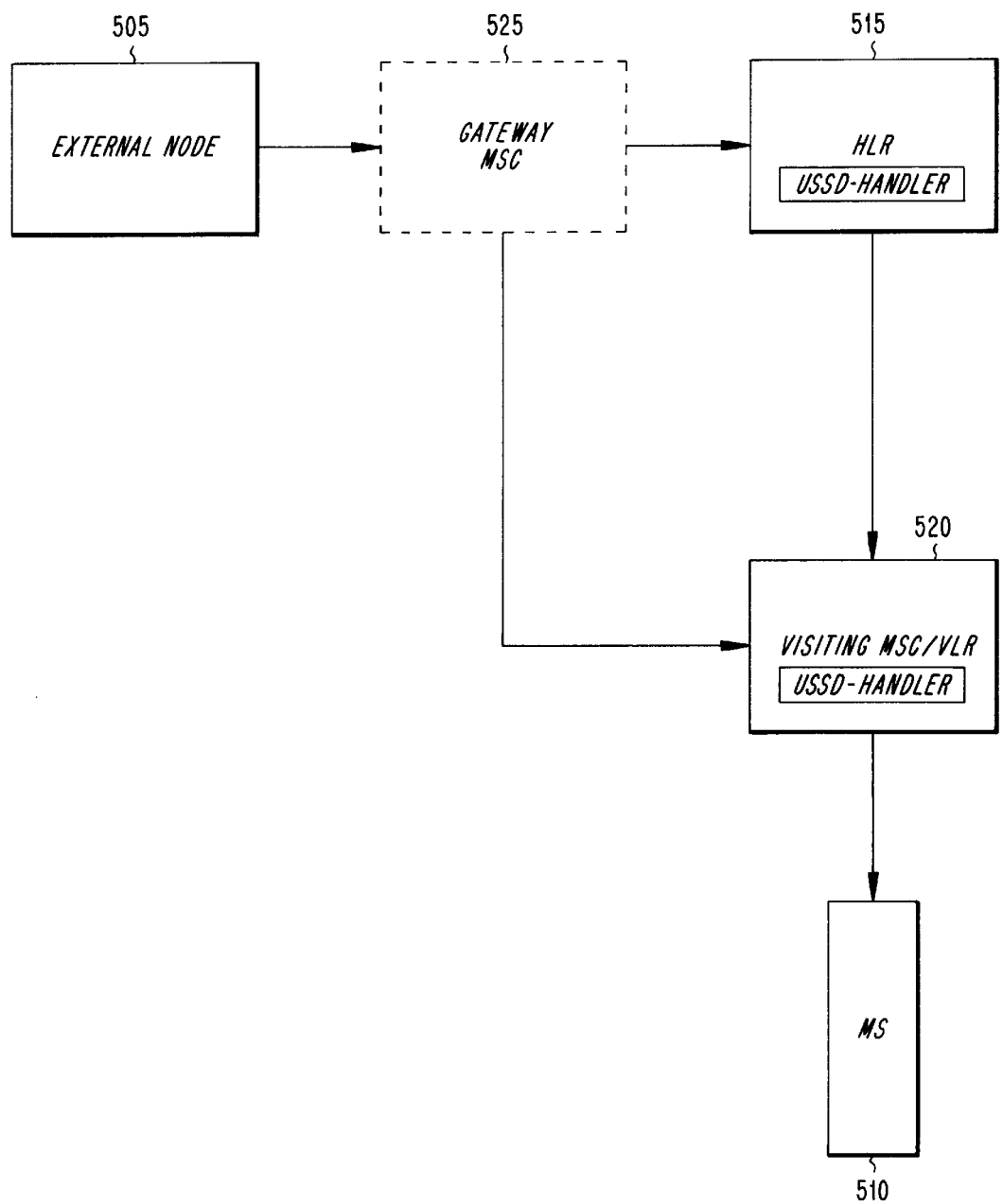

TELEMETRY APPLICATION NUMBERING FOR SMS AND USSD

BACKGROUND

The present invention relates to mobile telecommunication switching networks. More specifically, the present invention relates to the interrogation of mobile stations that are statically employed (i.e., immobile), such as mobile stations employed in telemetry applications, and how a mobile telecommunications switching network can take advantage of this immobility to conserve the limited supply of subscriber numbers and to reduce the ever increasing workload on network components such as the home location register (HLR).

Mobile telecommunications networks, such as the Personal Digital Telephone System (PDC) in Japan, and the Groupe Special Mobile (GSM) System in Europe, provide services other than cellular voice services. For example, mobile telecommunications networks now provide messaging services. Messaging services, in general, permit mobile stations to be interrogated using short message packets, wherein the message packets typically include requests, and responses to requests, for non-voice type data. In the PDC system, a well-known short message service (SMS) is employed as a bearer for short message packets. In GSM, a similar SMS is employed as well as a well-known signalling mechanism known as unstructured supplementary service data (USSD).

In one example, SMS may be employed as a bearer for short message packets in a telemetry application. In accordance with this exemplary use of SMS, it is characteristic for a host computer to contact one or more telemetry sites over a mobile link, wherein each telemetry site is supported by mobile station. The host computer uses short message packets to interrogate each of the one or more telemetry sites. The interrogation generally involves a request that each of the sites transmit certain information back to the host computer. For example, a utility company, such as an electric power company, might employ a host billing computer to interrogate electric meters over a mobile link, wherein each of the electric meters are supported by a mobile station. In this example, the billing computer transmits to the one or more electric meters a short message requesting that each meter transmit their current meter reading back to the billing computer. The request includes a unique subscriber number for each meter so that the short message containing the request is properly delivered by the telecommunications switching network. The host computer, upon receiving the requested information, can then automatically bill its customers.

In all mobile telecommunications networks, each subscriber is assigned a unique numerical identity. In the PDC system, the unique numerical identity is called the mobile subscriber number (MSN). The MSN, in turn, includes an access code, an operator code and a subscriber number. In the GSM system, the unique numerical identity is called the mobile subscriber ISDN (MSISDN) number. The purpose of the MSNs and the MSISDNs is to provide each subscriber with a unique address within the PDC and GSM networks respectively. As one skilled in the art will readily appreciated, the MSNs and the MSISDNs are part of the E.164 international number plan. Herein below, MSN and MSISDN are frequently referred to as subscriber numbers, for the purpose of simplicity. In addition to assigning a unique subscriber number to each subscriber, the radio interface between each subscriber and the network is assigned an international mobile subscriber identity (IMSI), in accordance with the E.212 numbering plan. The IMSI is also used for distinguishing between mobile stations operating within a given network.

When a calling party (i.e., the party placing a call) dials a subscriber number (i.e., A MSN or a MSISDN) associated with a called party, the telecommunications network uses the subscriber number to access a subscriber record corresponding to the called party in the network HLR. The subscriber record contains, among other things, the information and procedures necessary for routing calls, short messages, and other services to the mobile switching center (MSC) service area in which the called party is located, and eventually to the mobile station corresponding to the called party. This information may include, for example, a mobile switching center identification number (MSC-ID) or a routing number, and an IMSI. The MSC-ID or routing number is used for routing the call or message to the appropriate MSC which controls the MSC service area in which the called party is located. The IMSI is then used to send the call or message from the MSC to the mobile station.

In accordance with the present state of the art, every subscriber has a unique subscriber number. This is true whether the subscriber subscribes to a cellular voice service or a non-voice service, such as telemetry. Unfortunately, as the demand for mobile services increases, the availability of subscriber numbers decreases. In addition, the increase in demand for mobile services has drastically increased the workload on telecommunications network components such as the HLR. This, in turn, decreases network performance as it takes a longer period of time to access the HLR to obtain the information and/or procedures necessary to locate and service intended subscribers within the switching network. Therefore, a need exists wherein a telecommunications switching network can limit the number of subscriber numbers assigned, thereby preventing the exhaustion of the E.164 numbering plan, and to reduce the workload on network components, particularly the HLR, to prevent network performance degradation.

SUMMARY

The present invention takes advantage of the fact that in some mobile telecommunications network applications, for example, in most telemetry applications, the mobile stations are not truly mobile. In other words, the location of mobile stations employed for such purposes does not change. Since the location of these mobile stations is already known, the present invention does not require that the calling party (e.g., a host computer) specify a subscriber number to locate such mobile stations. Accordingly, there is no need to assign unique subscriber numbers to these mobile stations. Therefore, the present invention reduces the number of required subscriber numbers by eliminating the need to assign such numbers to mobile stations employed for static applications. Moreover, the present invention reduces the traffic into and out of the network HLR, as there is no longer any need to access the HLR database to obtain location information.

Accordingly, it is an objective of the present invention to reduce the number of subscriber numbers for mobile stations operating within a mobile telecommunications network.

It is another objective of the present invention to reduce and/or eliminate the necessity of assigning subscriber numbers to mobile stations that are specifically employed in static and or non-mobile applications.

It is still another objective of the present invention to reduce the number of IMSIs required for mobile stations being utilized in Static or non-mobile applications.

It is yet another objective of the present invention to improve network performance by reducing the traffic and/or the workload on network components, particularly the network HLR.

In accordance with one aspect of the present invention, the foregoing and other objects are achieved by a method and/or an apparatus for routing a message to a called party in a telecommunications network. The method and/or apparatus involves generating a message, in a node that is external to the telecommunications network, for the called party. The message includes a subscriber identity code corresponding to the called party. The method and/or apparatus also involves transmitting the message from the external node to a network switching center associated with a service area, in which the called party is located, in accordance with an area identification code; and forwarding the message from the switching center to the called party as a function of the subscriber identity code, wherein the called party is statically located in the service area.

In accordance with another aspect of the present invention, the foregoing and other objects are achieved by a method and/or an apparatus for controlling the routing of a message in a mobile telecommunications network. The method and/or apparatus involves generating a message, in a node that is external to the mobile telecommunications network, to a mobile station statically located in an area of the mobile telecommunications network; appending a mobile station identification code to the message, wherein the mobile station identification code uniquely identifies the mobile station; and translating the mobile station identification code into an area identification code and an international mobile subscriber identity code. Once the mobile station identification code has been translated, the method and/or apparatus forwards the message to the mobile telecommunications network. The message is then routed to a switching center associated with the network area in which the mobile station is located, in accordance with the area identification code, and sent from the switching center to the mobile station using the international mobile subscriber identity code.

BRIEF DESCRIPTION OF THE DRAWINGS

The objects and advantages of the invention will be understood by reading the following detailed description in conjunction with the drawings in which:

FIG. 5 is a diagram of an external node transmitting information to a mobile station using USSD.

DETAILED DESCRIPTION

Figure 1:
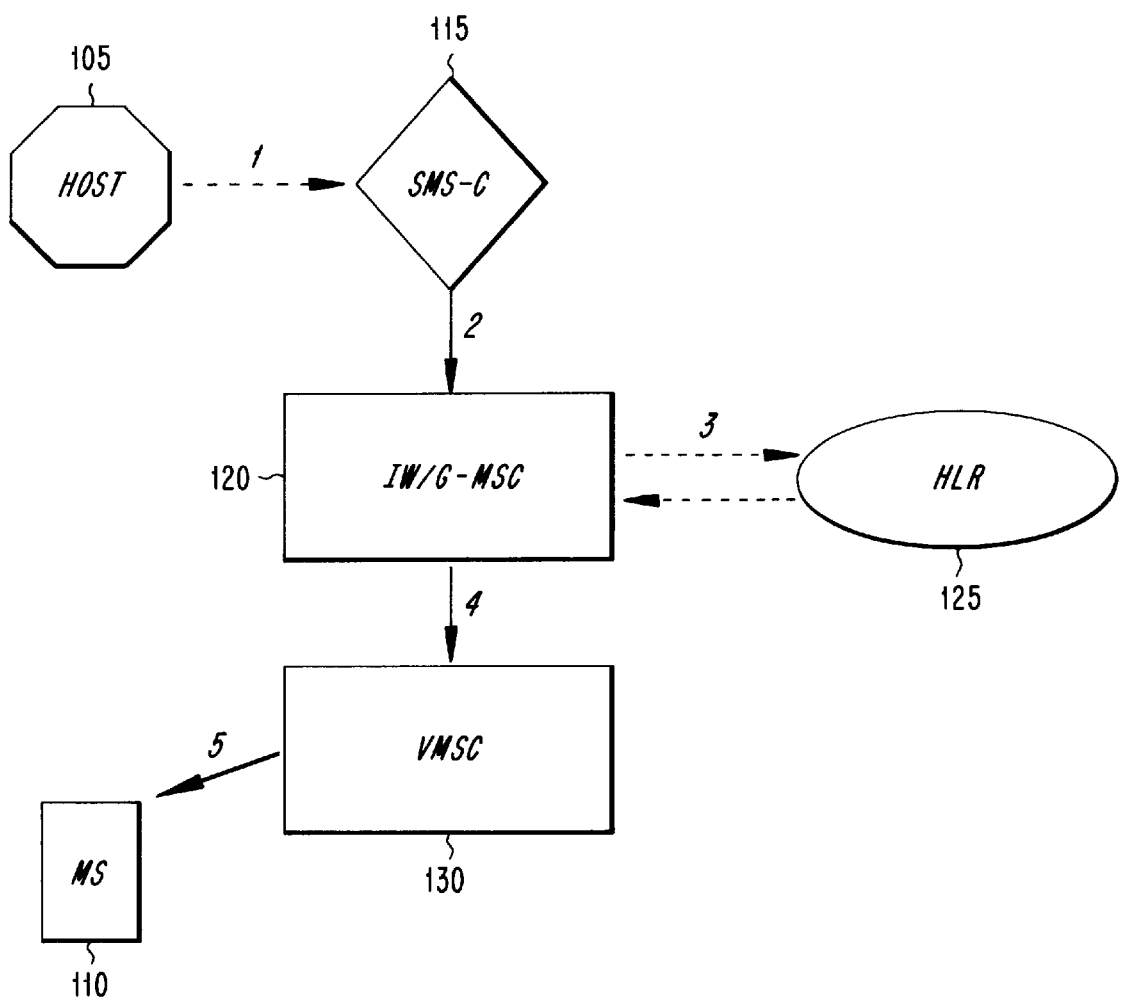
FIG. 1 is diagram depicting a host computer placing a short message to a mobile station in the PDC system, in accordance with the prior art.

FIG. 1 illustrates how a host computer 105 interrogates a mobile station 110 in the PDC system, in accordance with the present state of the art. First, the host computer 105 submits (1) a request for a message to be delivered to one or more mobile stations (e.g., mobile station 110). In the PDC system, the message request is submitted to a short message service center (SMS-C) 115. Generally, the SMS-C 115 is a node external to the switching network. The function of the SMS-C 115 is to take the host computer's request and construct one or more appropriate messages in accordance with the short message service protocol. In order to ensure that each message reaches the intended mobile station, each message has appended to it a MSN.

Next, the SMS-C 115 transmits (2) the message, along with the MSN, to an inter-working/gateway mobile switching center (IW/G-MSC) 120. The IW/G-MSC 120 then forwards (3) the MSN to the home location register (HLR) 125. The HLR 125 is essentially a large database that contains a subscriber record for each subscriber in the network. The subscriber record includes, among other things, information identifying which of the many service areas the subscriber is currently located in, as one skilled in the art will readily appreciate. Accordingly, the HLR 125 forwards to the IW/G-MSC 120, what is called a pursuit routing number (PRN) and an IMSI. The PRN is essentially an identification number or address for the mobile switching center (MSC), or visiting mobile switching center (VMSC) 130, controlling the service area in which the mobile station 110 is located.

The IW/G-MSC 120 packages the IMSI into an end-to-end information field of a message packet, as is well-known in the art. The IW/G-MSC 120 then forwards (4) the message packet to the appropriate VMSC 130, in accordance with the PRN, using an ISDN user part (ISUP) signalling protocol. The VMSC 130 then unpacks the message packet, pages the mobile station 110 using the IMSI, and delivers the short message containing the host computer's request to the mobile station 110.

Figure 2:
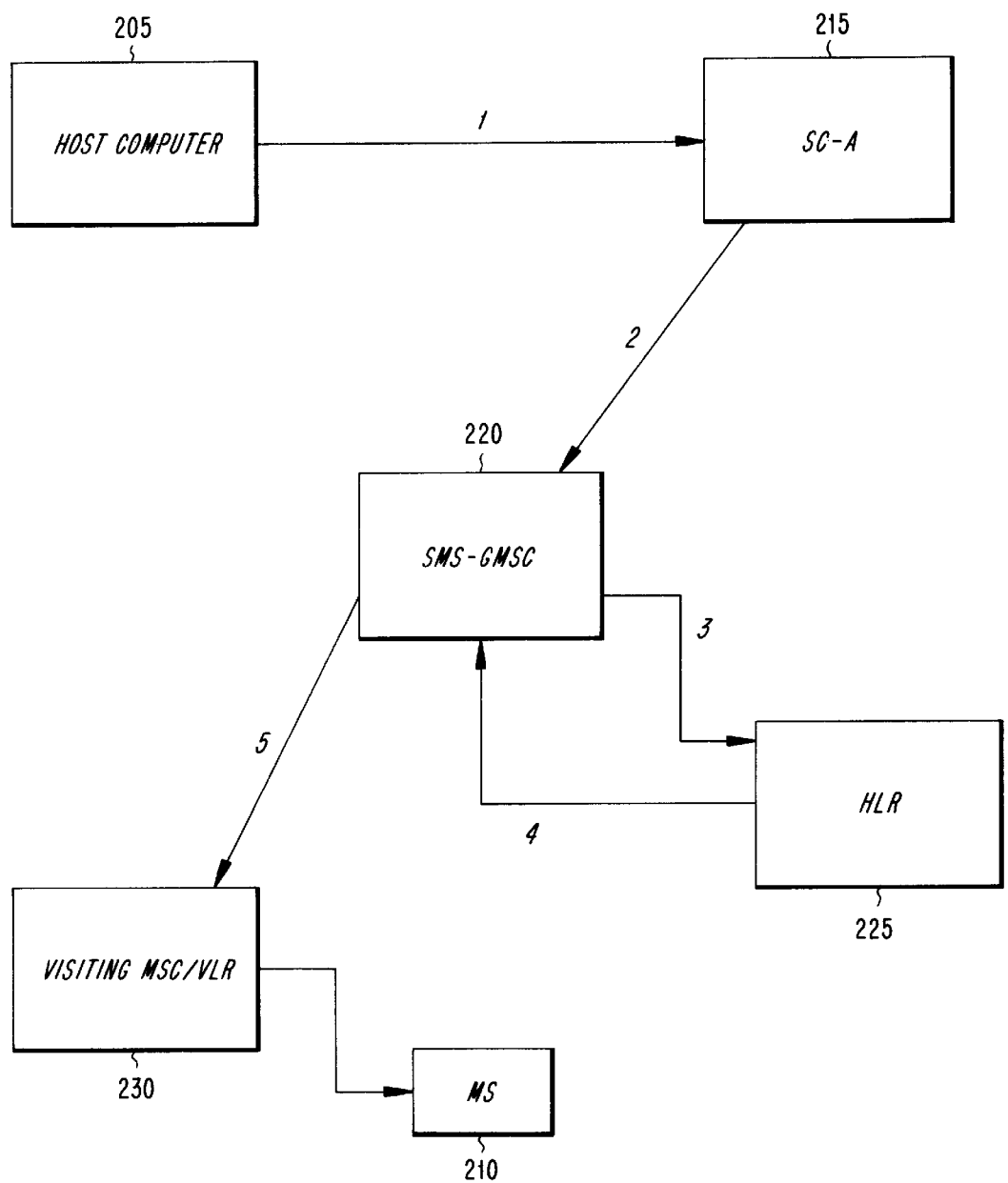
FIG. 2 is a diagram depicting a host computer transmitting a short message to a mobile station in the GSM system, in accordance with the prior art.

FIG. 2 illustrates how a host computer 205 similarly interrogates a mobile station 210 in the GSM system using a short message service protocol, in accordance with the present state of the art. First, the host computer 205 generates a short message request. Appended to the short message request is the address of a desired short message service center (SC), for example, SC-A 215. Also appended to the short message request is the MSISDN that corresponds to the intended mobile station 210. The host computer 205 then transmits (1) the short message request to the SC-A 215 over an SME interface (e.g., a GSM 03.49 interface), as is well understood by those skilled in the art.

The SC-A 215 then forwards (2) the short message to the GSM network. The SC-A 215 transmits the short message, for example, in accordance with a well-known SMS mobile application protocol 03.49 (e.g., SMS-MAP). The short message enters the network via a short message service, gateway mobile switching center (SMS-GMSC) 220. The SMS-GMSC 220 then uses the SMS-MAP to transmit (3) a send routing information for short message (SRIFSM) instruction to the HLR 225. The SRIFSM instruction also contains the MSISDN corresponding to the intended mobile station 210. The HLR 225 uses the MSISDN to access the subscriber record corresponding to mobile station 210. As described above, the subscriber record contains, among other things, information relating to the location of the mobile station 210. In response to the SRIFSM instruction, the HLR 225 sends (4) an MSC-ID code and an IMSI to the SMS-GMSC 220, wherein the MSC-ID code is the network address for the VMSC 230 controlling the service area in which the mobile station 210 is located. The SMS-MSC 220, in turn, sends (5) the short message to the VMSC 230, which forwards the message to the mobile station 210 using the IMSI.

In GSM, the host computer 205 may alternatively employ a USSD signalling protocol to communicate with a desired mobile station, as described in co-pending U.S. patent application Ser. No. 08/303,027. In accordance with the USSD signalling protocol, the host computer 205 typically interfaces directly with the network HLR 225 or with the VMSC 230. Moreover, the request generated by the host computer 205 contains or includes the MSISDN corresponding to the intended mobile station 210. The MSISDN is then translated into a VMSC-ID and/or an IMSI. Therefore, the same inefficiencies that plague the network when the host computer 205 transmits a message packet to the mobile station 210 in accordance with the SMS as illustrated in FIG. 2, also apply if the host computer employs USSD.

Figure 3:
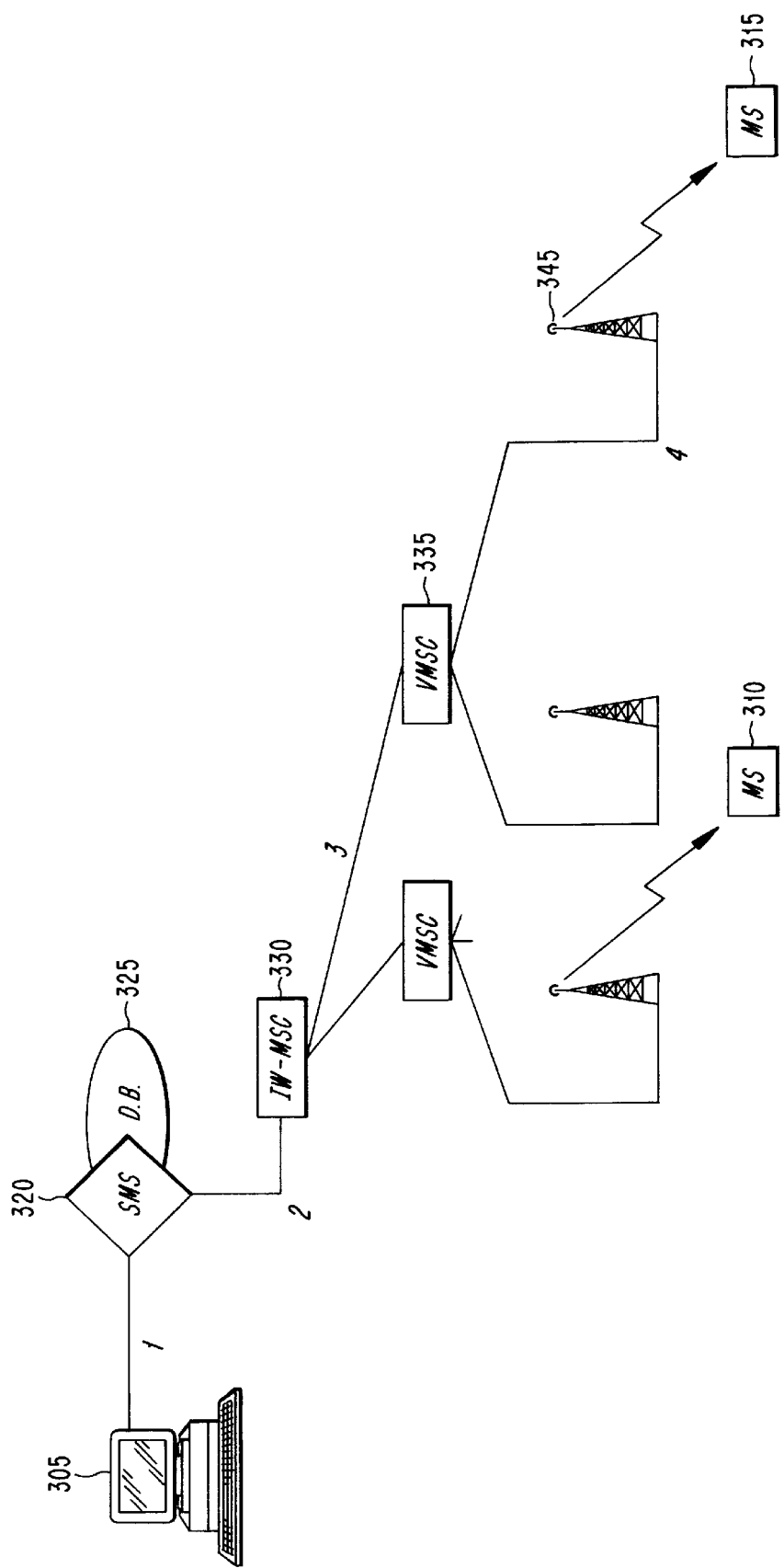
FIG. 3 is a diagram of a host computer transmitting a short message to a mobile station in the PDC system, in accordance with the present invention.

FIG. 3, however, illustrates how a host computer 305, in accordance with the present invention, interrogates one or more mobile stations in the PDC system, wherein the mobile stations are employed in a static application such as a telemetry application, or a remote programming application. This does not mean, however, that the mobile station is completely fixed or immobile. The mobile station may in fact be restricted in mobility with respect to a particular area or region within the network such as a mobile station service area and/or a paging area.

First, the host computer 305 submits (1) a request to transmit a message, using a SMS, to one or more mobile stations such as the mobile station 310 and/or the mobile station 315. The mobile stations 310 and 315 are identified in the message request by a unique, though preferably descriptive alpha-numeric address, rather than an MSN. For example, if the host computer 305 is a billing computer for a utility company, such as an electric power company, and the mobile stations 310 and 315 are electric company meters, the host computer 305 might employ descriptive alpha-numeric addresses such as METER00310 and METER00315 to uniquely identify the mobile stations 310 and 315. However, one skilled in the art will recognize that any unique sequence, such as a unique binary sequence, or a unique sequence of recognizable characters and/or symbols may be used to compose a mobile station address.

Next, the SMS-C 320 receives the message request, and with the aid of a database 325 or a lookup table (not shown), the SMS-C 320 translates the one or more descriptive mobile station alpha-numeric addresses. In a preferred embodiment of the present invention, the SMS-C 320 and the database 325 translate each mobile station address into a PRN and an IMSI, wherein the PRN is a network address for the VMSC controlling the service area in which the intended mobile station is located. In order for a message to reach the intended mobile station, each mobile station has a unique combination of PRN and IMSI.

It is not necessary, however, that each mobile station in the network have a unique IMSI. As is well-known in the art, a service area under the control of a single VMSC might include several paging areas. Accordingly, in an alternative embodiment of the present invention, each paging area is assigned a unique PRN, so that two mobile stations located in different paging areas (i.e., different paging areas associated with one MSC/VMSC or different paging areas associated with different MSCs/VMSCs) could share the same IMSI, thereby conserving the number of available IMSI codes, as well as MSNs.

In yet another alternative embodiment, the SMS-C 320 and the database 325 may translate the descriptive address of a mobile station into a pursuit routing address, an IMSI, and an MSN. As one of the primary purposes of the present invention is to conserve the limited supply of MSNs, all of the mobile stations in the network being employed for a particular static application could share the same MSN value.

It is important to note, that in each of the embodiments of the present invention described above, the MSN, by itself, is not relied upon to uniquely identify the intended mobile station. In addition, there is no need to interrogate the network HLR to obtain the intended mobile station's network location. As explained above, this information is more conveniently stored in the database 325 associated with the SMS-C 320. Therefore, aside from conserving the number of MSNs and, if desired, the number IMSIs assigned to the various subscribers and mobile stations, the present invention also reduces the workload on the network HLR, thereby increasing the efficiency of the network and decreasing message delivery latency rates.

Once the SMS-C 320 and the database 325 have translated the descriptive alpha-numeric address of each intended mobile station into a unique combination of PRN and IMSI, the SMS-C 320 submits (2) a short message packet using the ISUP signalling protocol to the switching network through an IW/G-MSC 330. The IW/G-MSC 330 routes (3) the short message packet to the appropriate VMSC, for example, VMSC 335, in accordance with the PRN. The VMSC 335 then locates the intended mobile station within its service area utilizing the IMSI, for example mobile station 315. The VMSC 335 then sends (4) the message packet to the mobile station 315 through a base station 345. The mobile station 315 then unpacks the message packet and extracts the short message sent by the host computer 305.

Figure 4:
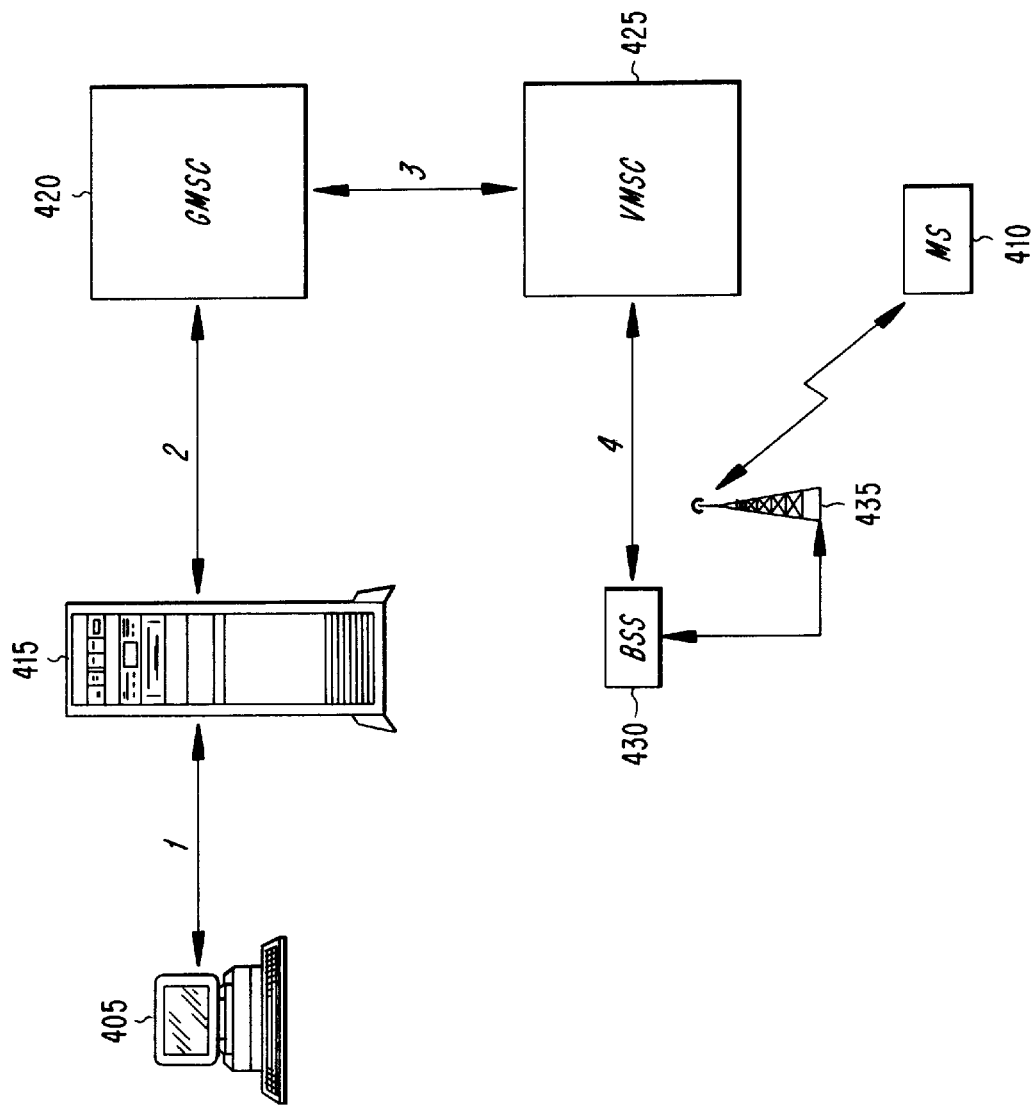
FIG. 4 is a diagram of a host computer transmitting a short message to a mobile station in the GSM system, in accordance with the present invention.

In an alternative embodiment, the host computer 305 contains the database or lookup table to translate a descriptive mobile station alpha-numeric address into a PRN and an IMSI. The host computer 305 then submits (1) the message, along with the PRN and the IMSI, to the SMS 320. In this alternative embodiment, the SMS 320 primarily handles the messaging protocols that are required for interfacing with the mobile network. The advantage of this embodiment is that the task of translating the descriptive mobile station alpha-numeric address into a PRN and an IMSI is performed in a node that is less likely to be affected by a non-real time task. In addition, maintaining the database or lookup table in the host computer 305 provides added security and helps to preserve customer confidentiality FIG. 4 illustrates how, in the GSM system, a host computer 405 may interrogate a mobile station, for example mobile station 410, using a SMS as a message bearer, in accordance with the present invention, wherein the mobile station 410 is employed in a static application such as a telemetry application or a remote programming application. In accordance with FIG. 4, the host computer 405 submits (1) a mobile terminated short message (MT-SM) to a short message SC 415. The MT-SM includes an identification code other than the MSISDN for the mobile station 410. As in the PDC system described above, the identification code may be descriptive in nature, and preferably alpha-numeric, although any unique sequence, such as a binary sequence or a sequence of recognizable characters and/or symbols may be utilized. Then, in a manner similar to the SMS-C 320 in FIG. 3, the SC 415 translates the identification code into an IMSI corresponding to the mobile station 410 and a VMSC-ID, wherein the VMSC-ID is an E.164 address corresponding to the MSC service area in which the mobile station 410 is located. The SC 415 transmits (2) the MT-SM into the switching network via a gateway MSC (GMSC) 420. The GMSC 420 then routes (3) the MT-SM to the VMSC 425 controlling the MSC service area in which the mobile station 410 is located. The VMSC 425 then transmits (4) the MT-SM to the mobile station 410 through the appropriate base station controller 430 and the base station transmitter 435.

In accordance with this embodiment of the present invention, a SRIFSM instruction need not be sent to the HLR to locate the mobile station 410. Hence, the workload on the network HLR is again reduced. Moreover, the unique combination of a VMSC-ID and IMSI is used to identify the MSC service area and the mobile station 410, respectively, not an MSISDN. Therefore, the utilization of an MSISDN can be avoided, thereby conserving the limited number of available MSISDNs. In another aspect of the present invention, the same MSISDN is assigned to each and every mobile station being employed for a particular static application, for use by various network services and applications, wherein each mobile station is still identified by a unique combination of VMSC-ID and IMSI.

In still another aspect of the present invention, each paging area within a single MSC service area may be identified by a unique MSC-ID number. In accordance with this aspect of the present invention, two or more mobile station may share the same IMSI, as long as they are located in different paging areas. Likewise, two or more mobile stations may share the same IMSI if they are located in different MSC service areas. This aspect of the present invention reduces the number of required IMSIs, as well as the required number of MSISDNs.

As one skilled in the art will readily appreciated, the mobile station 410 can also initiate a message, for example, in response to a message sent by the host computer 405. In accordance with present GSM standards, the mobile station 410 inserts its MSISDN into the mobile originated short message (MO-SM) as an originator address. However, as stated above, each mobile station being employed for the same application can be assigned the same MSISDN. The host computer 405 would then distinguish MO-SMs by the IMSI and or the unique combination of VMSC-ID and IMSI.

In an alternative embodiment, the host computer 405 translates the identification code into a VMSC-ID and an IMSI. The host computer 405 then submits (1) the MT-SM to the SC 415, wherein the MT-SM already includes the VMSC-ID and the IMSI. In this alternative embodiment, the SC 415 still handles the messaging protocols required for interfacing with the mobile network. The advantage of this embodiment is that the task of translating the identification code into a VMSC-ID and an IMSI is performed by a node (i.e., the host computer 405) that is less likely to be affected by a non-real time task. As stated above, maintaining the database or lookup table in the host computer provides added security and helps to preserve customer confidentiality.

As stated above, co-pending U.S. patent application Ser. No. 08/363,027, describes how the GSM system permits an external node 505 to communicate with a mobile station 510 using an USSD signalling protocol. In view of this, FIG. 5 illustrates yet another alternative embodiment of the present invention. In accordance with this embodiment, the external node (e.g., a host computer) generates a message, or a text string, which already includes the VMSC-ID and the IMSI needed to uniquely identify the mobile station 510. It was also explained above that USSD typically interfaces directly with a network HLR 515 or a VMSC 520 which controls the service area in which the mobile station 510 is located. Even though the external node might interface with the HLR 515, there is no need to access the subscriber record in the HLR 515 to obtain the information needed to send the message to the mobile station 510, because the external node 505 already provides the VMSC-ID and the IMSI. In addition, the external node 505 may interface with the network through a gateway MSC 525. Accordingly, FIG. 5 depicts the gateway MSC 525 as a dashed line. Alternatively, the host computer may be part of the network. In accordance with this alternative, the host computer would be able to transmit a message directly without having to interface with a GMSC or a HLR. Therefore, whether SMS or USSD is used as a message bearer, the number of MSISDNs assigned to mobile stations employed for static applications can be reduced and/or avoided all together by relying on the IMSI or unique combination of VMSC-ID and IMSI to identify each mobile station.

As mentioned throughout the preceding discussion, the various embodiments of the present invention provide a number of advantages. First, by relying on the IMSI or a unique combination of the PRN/MSC-ID and the IMSI for each mobile station within the switching network, the number of MSNs, in the PDC system, and the number of MSISDNs, in the GSM system, allocated to mobile stations employed for static applications can be reduced. Second, the number of IMSIs allocated to mobile stations can be reduced by ensuring that no two mobile stations sharing the same IMSI are located in the same paging area. Third, by avoiding the necessity to interrogate the network HLR to obtain location information, the workload of the network HLR is reduced, thereby increasing the efficiency of the network and reducing message delivery latency rates.

The present invention has been described with reference to several exemplary embodiments. However, it will be readily apparent to those skilled in the art that it is possible to embody the invention in specific forms other than those of the exemplary embodiments described above, without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for routing a message to a called party statically located within a service area of a mobile telecommunications network comprising the steps of:

in a node that is external to the mobile telecommunications network, generating a message for the called party, in accordance with a short message service, that includes a service area identification code and a mobile station code corresponding to the called party, wherein there is a static relationship between the mobile station code and the service area identification code, such that the mobile station code and the service area identification code together uniquely identify the mobile station in the mobile telecommunications network;

transmitting the message from the external node to a network switching center associated with the service area, in accordance with the service area identification code wherein the message is transmitted through a network home location register, bypassing a subscriber record in the network home location register; and forwarding the message from the switching center to the mobile station as a function of the mobile station code, wherein the mobile station is supporting a static application.

2. The method of claim 1 further comprising the step of:
in a host computer, generating a message request and a descriptive, alpha-numeric name identifying the called party;
transmitting the message request and the descriptive, alpha-numeric name from the host computer to the external node, wherein the external node is a short message service center; and
in the external node, generating the message for the called party from the message request and the descriptive, alpha-numeric name, wherein the external node translates the descriptive, alpha-numeric name into the service area identification code and the mobile station code.

3. The method of claim 2 further comprising the step of:
forwarding the message from the short message service center to the network switching center, bypassing a network home location register.

4. The method of claim 1, wherein the mobile station code combined with the service area identification code is unique for each party operating in the telecommunications network.

5. The method of claim 4, wherein the service area contains a plurality of paging areas.

6. The method of claim 1, wherein the static application is a telemetry application.

7. The method of claim 1, wherein the static application is a remote programming application.

8. A method for routing non-voice messages in a mobile telecommunications network comprising the steps of:
external to the mobile telecommunications network, generating a non-voice message for a mobile station supporting a static application in a service area of the mobile telecommunications network;
appending an alpha-numeric name, associated with the mobile station, to the non-voice message;
translating the alpha-numeric name into a service area identification code and an international mobile subscriber identity code, where there is a static relationship between the service area identification code and the international mobile subscriber identity code, and wherein the service area identification code and the international mobile subscriber identity code together uniquely identify the mobile station within the mobile telecommunications network;
forwarding the message to the mobile telecommunications network;
routing the message to a switching center associated with the service area in which the mobile station is located, in accordance with the service area identification code wherein said routing further comprises the step of transmitting the message through a network home location register, bypassing a subscriber record in the network home location register; and
sending the message from the switching center to the mobile station using the international mobile subscriber identity code.

9. The method of claim 8, wherein said step of generating a non-voice message for the mobile station comprises the step of:
generating a short message packet in accordance with a short message service.

10. The method of claim 8, wherein said step of routing the message to a switching center comprises the step of:
bypassing a network home location register.

11. The method of claim 8, wherein the international mobile subscriber identity is shared by two or more mobile stations, and wherein each of the two or more mobile stations is located in a different network service area.

12. The method of claim 8, wherein the service area, in which the mobile station is located, contains a plurality of paging areas.

13. An apparatus for routing a message to a called party statically located in a service area of a mobile telecommunications network comprising:
a telecommunications node located externally to the mobile telecommunications network, wherein said node generates a message, in accordance with a short message service, for the called party that includes a service area identification code and a mobile station code corresponding to the called party, where there is a static relationship between the mobile station and the service area, and wherein the mobile station code and the service area identification code together uniquely identify the mobile station in the mobile telecommunications network;
means for transmitting the message from the external node to a network switching center associated with the service area, in accordance with the service area identification code wherein the message is transmitted through a home location register, bypassing a subscriber record access task in the network home location register; and
means for forwarding the message from the switching center to the called party as a function of the mobile station code, wherein the mobile station is supporting a static application.

14. The apparatus of claim 13 further comprising:
in a host computer, means for generating a message request and a descriptive, alpha-numeric name identifying the called party;
means for transmitting the message request and the and the alpha-numeric name from the host computer to the external node, where the external node is a short message service center; and
in the external node, means for generating the message for the called party from the message request and the descriptive alpha-numeric name, wherein the external node translates the descriptive alpha-numeric name into the service area identification code and the mobile station code.

15. The apparatus of claim 13, wherein the mobile station code combined with the service area identification code is unique for each party operating in the telecommunications network.

16. The apparatus of claim 15, wherein the service area contains a plurality of paging areas.

17. The method of claim 13, wherein the static application is a telemetry application.

18. The method of claim 13, wherein the static application is a remote programming application.

19. The apparatus of claim 14 further comprising:
means for forwarding the message from the short message service center to the network switching center, bypassing a network home location register.

20. An apparatus for routing non-voice messages in a mobile telecommunications network comprising:
a host computer, located external to the mobile telecommunications network, for generating a non-voice message for a mobile station supporting a static application in a service area of the mobile telecommunications network;
means for appending an alpha-numeric name, associated with the mobile station, to the non-voice message;

means for translating the alpha-numeric name into a service area identification code and an international mobile subscriber identity code, where there is a static relationship between the service area identification code and the international mobile subscriber identity code, and wherein the service area identification code and the international mobile subscriber identity code together uniquely identify the mobile station in the mobile telecommunications network;

means for forwarding the message to the mobile telecommunications network;

means for routing the message to a switching center associated with the service area in which the mobile station is located, in accordance with the service area identification code, said means for routing further comprising a means for transmitting the message through a network home location register, bypassing a subscriber record in the network home location register; and means for sending the message from the switching center to the mobile station utilizing the international mobile subscriber identity code.

21. The apparatus of claim 20, wherein said means for translating the alpha-numeric name is a short message service center, and wherein the short message service center forwards the message as a short message packet in accordance with a short message service.

22. The apparatus of claim 20, wherein said means for routing the message to a switching center comprises:

means for bypassing a network home location register.

23. The apparatus of claim 20, wherein the international mobile subscriber identity is shared by two or more mobile stations, and wherein each of the two or more mobile stations is located in a different network service area.

24. The apparatus of claim 20, wherein the service area in which the mobile station is located contains a plurality of paging areas.

25. In a mobile telecommunications network, a method for routing a message from a host computer to a mobile station comprising the steps of:

in the host computer, generating a message for the mobile station that includes a service area identification code and a mobile station code, wherein the mobile station code has a static relationship with respect to the service area identification code, and wherein the mobile station code and the service area identification code together uniquely identify the mobile station within the telecommunications network;

transmitting the message from the host computer to a network switching center associated with a service area in which the mobile station is located, in accordance with the service area identification code, wherein the message is transmitted through a home location register, bypassing a subscriber record access task in the network home location register; and forwarding the message from the switching center to the mobile station as a function of the mobile station code, wherein the mobile station is supporting a static application in the service area.

26. The method of claim 25, wherein said step of transmitting the message from the host computer to the network switching center comprises the step of:

sending the message in a short message packet.

27. The method of claim 25, wherein said step of transmitting the message from the host computer to the network switching center comprises the step of:

sending the message using an unstructured supplementary service data signalling protocol.

28. The method of claim 25, wherein the mobile station code is shared by two or more mobile stations, and wherein each of the two or more mobile stations is located in a different service area.

29. The method of claim 25, wherein the service area contains a plurality of paging areas.

30. The method of claim 25, wherein the static application is a telemetry application.

31. The method of claim 25, wherein the static application is a remote programming application.

* * * * *